United States Patent
Erdmannsdoerfer

(10) Patent No.: US 6,235,089 B1
(45) Date of Patent: May 22, 2001

(54) FILTER INSERT

(75) Inventor: Hans Erdmannsdoerfer, Dobel (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/297,672

(22) PCT Filed: Oct. 7, 1997

(86) PCT No.: PCT/EP97/05511

§ 371 Date: Jul. 9, 1999

§ 102(e) Date: Jul. 9, 1999

(87) PCT Pub. No.: WO98/19772

PCT Pub. Date: May 14, 1998

(30) Foreign Application Priority Data

Nov. 6, 1996 (DE) .............................. 196 45 666

(51) Int. Cl.[7] ................................ B03C 3/017
(52) U.S. Cl. ................... 96/55; 55/385.3; 55/486; 55/487; 55/492; 55/527; 95/287
(58) Field of Search ............... 55/486, 527, 482, 55/492, 487, 528, 385.3, DIG. 39; 95/286, 287; 96/15, 69, 55

(56) References Cited

U.S. PATENT DOCUMENTS

| 4,069,026 | * | 1/1978 | Simm et al. | 95/63 |
| 4,233,042 | * | 11/1980 | Tao | 55/482 |
| 4,759,782 | * | 7/1988 | Miller et al. | 55/487 |
| 5,411,576 | * | 5/1995 | Jones et al. | 96/15 X |
| 5,453,116 | * | 9/1995 | Fischer et al. | 55/527 X |
| 5,782,941 | * | 7/1998 | Matsunuma et al. | 55/487 X |
| 5,849,375 | * | 12/1998 | Smith et al. | 428/34.5 |

FOREIGN PATENT DOCUMENTS

| 3017852 | * | 5/1981 | (DE) . |
| 4342406 | * | 6/1995 | (DE) . |
| 695572 | * | 2/1996 | (EP) . |
| 988692 | * | 4/1965 | (GB) . |
| 1490270 | * | 10/1977 | (GB) . |

OTHER PUBLICATIONS

\* References Checked Were Either Cited in Specification or In PCT/EP97/05511.\*

\* cited by examiner

Primary Examiner—Richard L. Chiesa
(74) Attorney, Agent, or Firm—Evenson, McKeown, Edwards & Lenahan, P.L.L.C.

(57) ABSTRACT

The invention concerns a filter insert for separating oil out of a flow of gas; the filter insert (1) comprising a pure gas side (2) and an untreated gas side (3) as well as support means (4) and at least two separation zones (5; 6) of different degrees of fineness.

8 Claims, 1 Drawing Sheet

FILTER INSERT

BACKGROUND AND SUMMARY OF THE INVENTION

The invention relates to a filter insert for separating oil out of a flow of gas. Such filter inserts are known, for instance from GB 988 692. If one wants to use this type of filter insert in, for example, internal combustion engines which are to satisfy the latest exhaust regulations and, at the same time, are simple and economical to build and also dispose of, the disadvantage is that this cannot be done because of the complex construction and great number of materials used.

Therefore, it is the object of the invention to improve a filter insert and a device for separating out oil spray of the type named in the introduction in order to create a reliably working device and filter element for separating out oil spray which are simple and economical to produce and dispose of as well.

This object of the invention is solved according to the invention in that the filter insert has a filtered gas side and an unfiltered gas side and means of support and has at least two separation zones of varying degrees of fineness. Because of the reduction of the parts required, cost is lowered for production as well as for the necessary disposal at the end of product life. The use of separation zones of varying degrees of fineness leads to improved separating out of the oil since correspondingly appropriate coalescence surfaces are available for oil drops of different sizes.

An advantageous development of the invention provides that the means of support are permeable to gas. In this way, the support fulfills several functions. On the one hand it functions as a support, on the other hand, depending on its permeability, as an oil separator of great or less coarseness which fulfills the function of separation and drainage of, for example, large oil particles.

In another advantageous development, it is provided that a separation zone is comprised of textile thread. This separation zone, knit, woven or wound as appropriate, is responsible for separating oil droplets which coagulate best on separating elements in the millimeter range. The use of this kind of separating means ensures low loss of pressure at a sufficient degree of oil separation.

In another advantageous development, it is provided that a separation zone is comprised of fibers or filaments which adhere to one another and therefore has a fine portion. This fine portion is responsible for separation of oil in the range of small oil particles. In addition to its separation and drainage functions with regard to the oil in the gas, this zone, also described as fleece, protects the wound separation zone of the filter element which, particularly when made of glass fibers, is very sensitive to mechanical strain; additionally it forms the spatial boundary, as in a housing, in order to do without a further packaging shell.

Another advantageous development provides that the material of the separation zone is made of plastic, such as polyester, polyester amide, polyester acrylic or aromatic polyamide fiber, metal or metal oxide. The use of a textured filament thread is particularly advantageous. The combination in textured thread of low filament diameter and high volume ensures a good result in oil separation, for example, in the aerosol region, since especially in motors, which must satisfy the continually increasing strictness of requirements for pollution burden in exhaust, a high degree of oil separation is important with a low loss of pressure and, at the same time, without the entrance of, for example, particles of soot, where individual fibers preferably are smaller than 10 mm.

Particularly in this size range the separation of oil from aerosol is especially effective.

In another advantageous development, it is provided that the material of at least one of the separation zones has electrostatic characteristics, which improves the process of oil separation.

In another advantageous development of the invention, it is provided that at least one of the separation zones exhibits either hydrophobic or hydrophilic characteristics; this results in a separation behavior in the filter element which can be influenced.

Another advantageous development of the invention provides that in a device for separating out oil spray a filter element can be used. This shows clearly that this type of filter element can be employed universally, for example in pipe cross-sections and/or practically any shaped housing.

In another advantageous development of the invention, it is provided that the device for separating out oil spray can be employed particularly in the intake section of internal combustion engines. The use of a device of this type, in particular in the intake section of an internal combustion engine, is of preventative character with regard to the situation of emissions and pollution within the machine, specially with regard to the life of the functioning elements like, for example, a turbo-supercharger or oil cooler and similar parts.

In another advantageous development of the invention, it is provided that the device for separating out oil can be employed to remove oil from the blow-by gases of an internal combustion engine. For example in diesel motors, mostly with turbo-superchargers, to avoid contact of the admission as well as the turbine blades and other functional elements with gases containing oil in order to avoid damage and also additional pollution burdens.

These and other features of preferred developments of the invention are based not only on the claims but also on the specification and the drawings, where each of the individual characteristics can be realized either alone or together in the form of sub-combinations in the embodiment of the invention and in other fields and can represent embodiments that are advantageous as well as patentable in themselves, for which protection is claimed here.

DETAILED DESCRIPTION OF THE PREFERRED EMBODIMENTS

Figure 1:
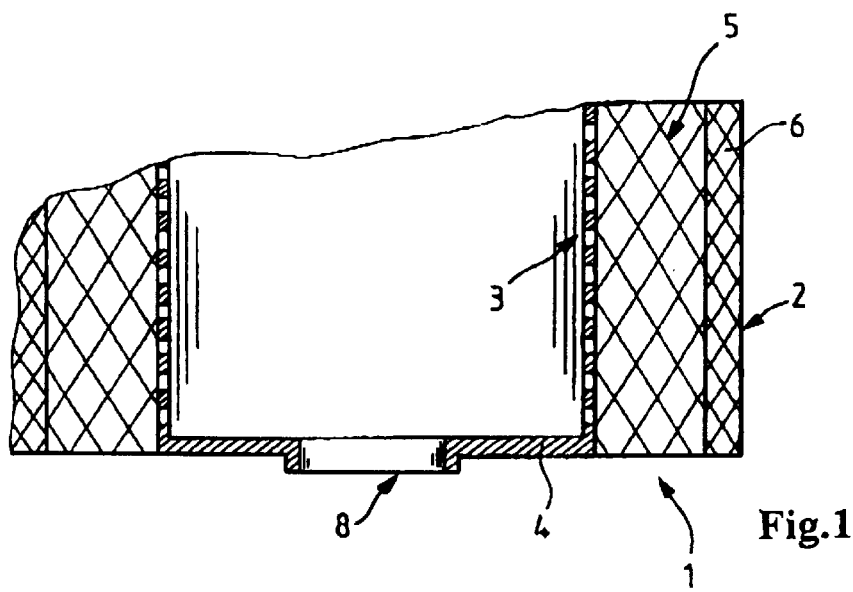
FIG. 1 a cross-section of a filter element

The filter element 1 shows, as represented in FIG. 1, a filtered gas side 2 and an unfiltered gas side 3. The filter element 1 preferably has a means of support 4 on the unfiltered gas side. The means of support shown in FIG. 1 is comprised of a one-piece, pipe-shaped perforated plate which is surrounded by a first separation zone 5. This separation zone 5 is comprised of glass fiber thread wound around the pipe-shaped perforated plate which forms the means of support. A second separation zone 6 is arranged around the glass fiber wrap forming the first separation zone 5. In the exemplary embodiment shown in FIG. 1, the second separation zone 6 is comprised of fleece which also represents the outer boundary shell of the filter element 1. The filter element 1 has a gas inlet opening 8 through which the gas mixture from which oil is to be removed is admitted.

This gas inlet opening 8 is located on the front of the means of support 4. The gas mixture enters the interior of the filter element 1 through this gas inlet opening 8, from which point the gas mixture containing oil enters the following separation zone radially through holes located on the jacket surface of the support 4. Already by passing the perforated plate of the support, the gas mixture is separated such that oil drops are separated from the gas mixture which then, in the first separation zone, move along the glass fiber thread structure towards the center of the earth. After the gas mixture has passed the perforated plate 4, it enters the first separation zone 5, in which larger oil droplets land on the surface of the wound glass fiber thread structure which likewise move away from the flow of gas by means of gravity. After this, the flow of gas with the remaining portion of oil enters the second separation zone 6, in which smaller oil droplets of the gas mixture land on the surface of the considerably finer structure of the fleece made from filaments.

Figure 2:
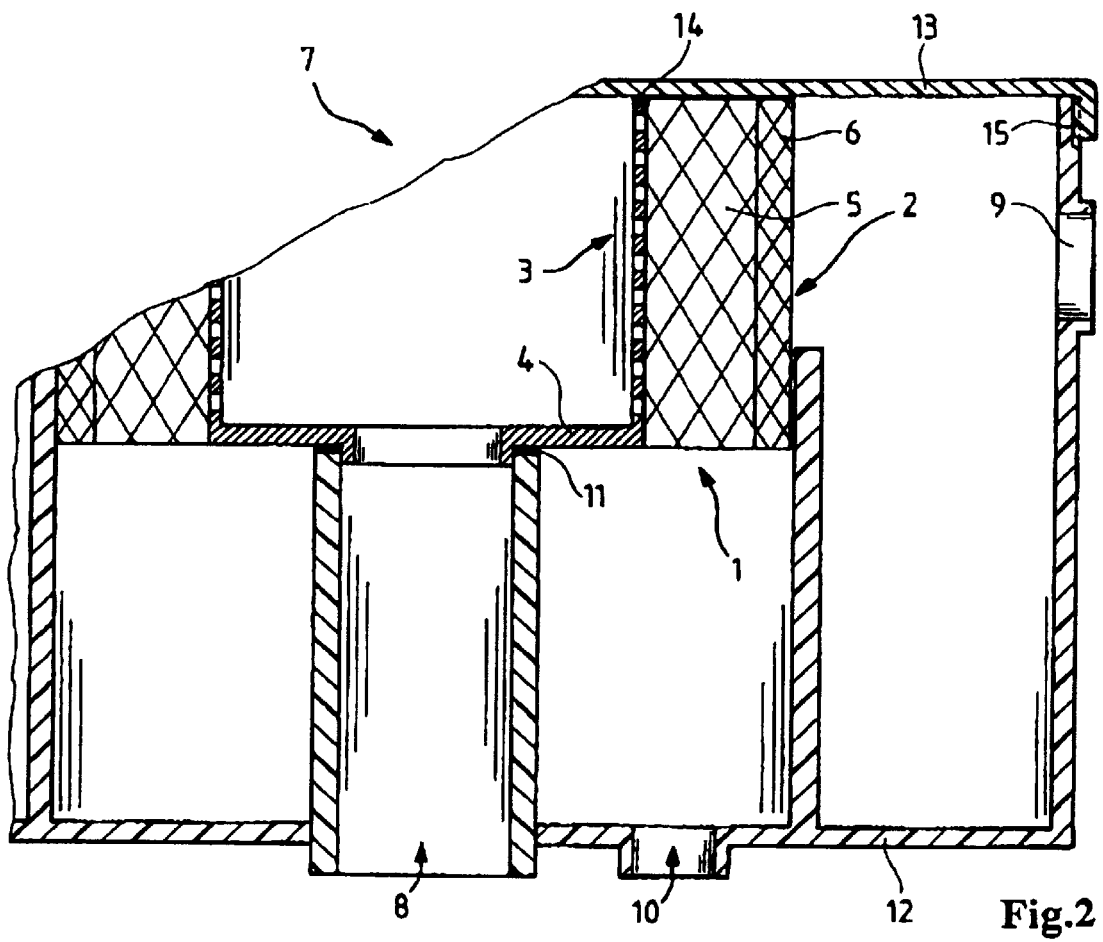
FIG. 2 a cross-section of a device for separating out oil

As shown in FIG. 2, the device for separating out oil spray is comprised of a housing 12, which holds the filter element 1. The housing 12 of the device for separating out oil spray has a gas inlet opening 8 and a gas outlet opening 9. As shown in FIG. 2, onto the gas inlet opening 8 a filter element 1 attaches which has, in this exemplary embodiment, a filtered gas side 2 and an unfiltered gas side 3. The filtered gas side 2 is divided from the unfiltered gas side in the housing 12 by means of two seals. In the region of the gas inlet opening 8, the unfiltered side is separated from the filtered side by seal 11. In the region of the side opposite the front of the perforated plate, the unfiltered side is separated from the filtered side by the seal 14 which is located between perforated plate and housing cover 13. The housing cover 13 can be attached to the housing 12 using a screw thread 15. In an alternative realization, one could use hook, snap or bayonet catches. The filter element 1 has support 4 on the unfiltered side. The means of support 4 is comprised of a one-piece, tube-shaped perforated plate which is surrounded by a first separation zone 5. The separation zone 5 is made of wound glass fiber thread. A second separation zone 6 is arranged in a ring shape around the glass fiber wrap which forms the first separation zone 5. The second separation zone 6 is comprised of fleece which also represents the outer boundary shell of the filter element 1.

The gas inlet is on the front of the means of support 4. Through an appropriate opening there, the gas mixture enters the interior of the filter element 1, from which point the gas mixture containing oil radially enters the separation zone 5 which follows the support through holes located on the jacket surface of the support 4. Already by passing the perforated plate of the support 4, the gas mixture is separated such that oil drops are separated from the gas mixture which then, in the first separation zone 5, move along the glass fiber thread structure towards the center of the earth. After the gas mixture has passed the perforated plate 4, it enters the first separation zone 5, in which larger oil droplets land on the surface of the wound glass fiber thread structure which likewise move away from the flow of gas by means of gravity. After this, the flow of gas with the remaining portion of oil enters the second separation zone 6, in which smaller oil droplets of the gas mixture land on the surface of the considerably finer structure of the fleece made from filaments, and, likewise, driven by gravity, find the path to the oil feedback opening. The gas thus freed from oil enters through gas outlet opening 9 the intake circuit of an internal combustion engine not pictured.

Under the oil separation element of the separation zones 5 and 6, the device for separating out oil has in its housing 12 an oil feedback opening 10 which, after the gas which contains oil has taken a sufficient path through the filter element, returns the separated oil to the circuit of the internal combustion engine not pictured.

The arrangement of the oil feedback opening 10 in housing 12 is shown in FIG. 2.

In an alternative realization, the material used in the separation zone possesses electrostatic characteristics.

In another realization, the material in the separation zone acts hydrophilic in one variation and hydrophobic in another variation.

REFERENCE NUMBER LIST

1. Filter element
2. Filtered gas side
3. Unfiltered gas side
4. Means of support
5. Separating zone
6. Separating zone
7. Device for separating out oil spray
8. Gas inlet opening
9. Gas outlet opening
10. Oil feedback opening
11. Seal
12. Housing
13. Housing cover
14. Seal
15. Screw thread

What is claimed is:

1. A filter insert for separating oil from a flow of gas comprising:

a perforated support; and at least two separation zones of varying degrees of fineness comprising a first separation zone radially supported by the perforated support and made of a textile thread which is wound;

wherein the perforated support and the at least two separation zones form a self-supporting structure without the need for additional support for the at least two separation zones in a direction of flow of separated oil through the filter insert.

2. Filter insert according to claim 1, wherein one separation zone is made of fibers or filaments which adhere to one another.

3. Filter insert according to claim 1, wherein one separation zone is made of plastic, metal or metal oxide material.

4. Filter insert according to claim 1, wherein at least one separation zone is made of a material which possesses electrostatic characteristics.

5. Filter insert according to claim 1, characterized in that at least one separation zone possesses hydrophobic or hydrophilic characteristics.

6. Device for separating out oil spray with a housing having a gas inlet opening, a filtered gas outlet opening and an oil feedback opening said housing containing a filter insert according to claim 1.

7. Device according to claim 6, wherein the device for separating out oil spray is employed in an intake section of an internal combustion engine.

8. Device according to claim 7, wherein the device for separating out oil spray is used to remove oil from blow-by gases of an internal combustion engine.

* * * * *